US012649145B2

(12) United States Patent
Fujii et al.

(10) Patent No.: US 12,649,145 B2
(45) Date of Patent: Jun. 9, 2026

(54) COMPOSITION FOR CARBON DIOXIDE SEPARATION AND METHOD FOR SEPARATING CARBON DIOXIDE

(71) Applicant: TOSOH CORPORATION, Shunan (JP)

(72) Inventors: Ryotaro Fujii, Shunan (JP); Kotaro Sakoda, Shunan (JP); Manabu Yanase, Shunan (JP); Hiroyuki Kiso, Shunan (JP)

(73) Assignee: TOSOH CORPORATION, Yamaguchi (JP)

( * ) Notice: Subject to any disclaimer, the term of this patent is extended or adjusted under 35 U.S.C. 154(b) by 767 days.

(21) Appl. No.: 17/795,411

(22) PCT Filed: Jan. 28, 2021

(86) PCT No.: PCT/JP2021/002966
§ 371 (c)(1),
(2) Date: Jul. 26, 2022

(87) PCT Pub. No.: WO2021/153650
PCT Pub. Date: Aug. 5, 2021

(65) Prior Publication Data

US 2023/0356182 A1 Nov. 9, 2023

(30) Foreign Application Priority Data

Jan. 28, 2020 (JP) ................................ 2020-011936
Mar. 19, 2020 (JP) ................................ 2020-049127
Jun. 26, 2020 (JP) ................................ 2020-110107

(51) Int. Cl.
*B01J 20/22* (2006.01)
*B01D 53/14* (2006.01)
*C01B 32/50* (2017.01)
*C07D 295/088* (2006.01)
*C07D 487/08* (2006.01)

(52) U.S. Cl.
CPC .......... *B01J 20/22* (2013.01); *B01D 53/1475* (2013.01); *B01D 53/1493* (2013.01); *B01D 2252/20447* (2013.01); *B01D 2252/20489* (2013.01); *B01D 2252/504* (2013.01); *B01D 2257/504* (2013.01)

(58) Field of Classification Search
None
See application file for complete search history.

(56) References Cited

U.S. PATENT DOCUMENTS 4,405,580 A 9/1983 Stogryn et al.
8,506,913 B2 8/2013 Murai et al.
2006/0178259 A1 8/2006 Schubert et al.
(Continued)

FOREIGN PATENT DOCUMENTS

CN 104338413 2/2015
CN 107261767 10/2017
(Continued)

OTHER PUBLICATIONS

International Search Report dated Apr. 6, 2021, for PCT/JP2021/002966, 5 pp., including English translation.
(Continued)

*Primary Examiner* — Daniel Berns
(74) *Attorney, Agent, or Firm* — NIXON & VANDERHYE, PC

(57) ABSTRACT

To provide a carbon dioxide separation composition which is excellent in carbon dioxide desorption efficiency (desorption amount/absorption amount) and durability to nitrogen oxides, and a method for separating carbon dioxide.

A carbon dioxide separation composition, containing at least one amine compound selected from the group consisting of an amine compound represented by the following formula (1):

(1)

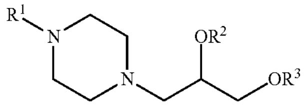

wherein $R^1$ to $R^3$ each independently represent a hydrogen atom or a $C_{1-4}$ alkyl group, and an amine compound represented by the following formula (2):

(2)

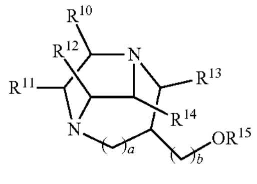

wherein $R^{10}$, $R^{11}$, $R^{12}$, $R^{13}$ and $R^{14}$ each independently represent a hydrogen atom, a $C_{1-4}$ alkyl group, a hydroxy group, a hydroxymethyl group, a 2-hydroxyethyl group or a $C_{1-4}$ alkoxy group, a and b are each independently 0 or 1 and satisfy the relation a+b=1, and $R^{15}$ is a hydrogen atom, a $C_{1-4}$ alkyl group, a methoxymethyl group, a methoxyethoxymethyl group or a 2-hydroxyethyl group.

19 Claims, No Drawings

(56) References Cited

U.S. PATENT DOCUMENTS

| | | | | |
|---|---|---|---|---|
| 2010/0126348 | A1 | 5/2010 | Shimizu et al. | |
| 2010/0162703 | A1 | 7/2010 | Li et al. | |
| 2011/0077376 | A1 | 3/2011 | Tokumoto et al. | |
| 2015/0044114 | A1 | 2/2015 | Murai et al. | |
| 2015/0126793 | A1* | 5/2015 | Laroche | C10L 3/12 585/860 |
| 2020/0137370 | A1 | 4/2020 | Tanaka et al. | |

FOREIGN PATENT DOCUMENTS

| | | | | |
|---|---|---|---|---|
| CN | 110229163 | A * | 9/2019 | C07D 487/08 |
| JP | 2006-240966 | | 9/2006 | |
| JP | 2006-528062 | | 12/2006 | |
| JP | 2008-238073 | | 10/2008 | |
| JP | 2010-37325 | | 2/2010 | |
| JP | 2010-516941 | | 5/2010 | |
| JP | 2015151368 | A | 8/2015 | |
| JP | 2017159288 | | 9/2017 | |
| JP | 2019-505607 | | 2/2019 | |
| WO | 2011121633 | | 10/2011 | |
| WO | 2019/030190 | | 2/2019 | |

OTHER PUBLICATIONS

Written Opinion of the ISA dated Apr. 6, 2021, for PCT/JP2021/002966, 7 pp., including partial English translation.

European Search Report in related EP Application No. 21747226.5 dated Jan. 31, 2024, 8 pages.

* cited by examiner

COMPOSITION FOR CARBON DIOXIDE SEPARATION AND METHOD FOR SEPARATING CARBON DIOXIDE

This application is the U.S. national phase of International Application No. PCT/JP2021/002966 filed Jan. 28, 2021, which designated the U.S. and claims priority to JP 2020-011936 filed Jan. 28, 2020, JP 2020-049127 filed Mar. 19, 2020, and JP 2020-110107 filed Jun. 26, 2020, the entire contents of each of which are hereby incorporated by reference.

TECHNICAL FIELD

The present invention relates to a carbon dioxide separation composition to selectively separate carbon dioxide from a carbon dioxide-containing gas mixture, and a method for separating carbon dioxide using the composition.

BACKGROUND ART

In recent years, to solve global warming problem, separation/recovery of carbon dioxide attracts attention, and development of carbon dioxide absorbing solutions has been actively conducted.

As a carbon dioxide absorbing solution, an aqueous monoethanolamine solution is most commonly used. Monoethanolamine is industrially easily available at a low cost, however, it has such a property that it does not desorb carbon dioxide absorbed at low temperature unless heated to high temperature of 120° C. or higher. And, if the carbon dioxide desorption temperature is the boiling point of water or higher, due to high latent heat and specific heat of water, a large amount of energy will be required to recover carbon dioxide.

Accordingly, development of amines having a carbon dioxide desorption temperature lower than monoethanolamine and thus lower energy for carbon dioxide recovery has been conducted. For example, N-methyldiethanolamine (Patent Document 1) has been proposed.

PRIOR ART DOCUMENTS

Patent Document

Patent Document 1: JP-A-2006-528062

DISCLOSURE OF INVENTION

Technical Problem

In recent years, carbon dioxide absorbing solutions being more excellent in carbon dioxide desorption efficiency (desorption amount/absorption amount) have been desired. Further, from the viewpoint of stable operation of carbon dioxide recovery equipment, carbon dioxide absorbing solutions in which precipitates are less likely to form even if nitrogen oxides are included, have been desired.

Under these circumstances, the present invention has been made to solve the above problems, and its object is to provide a carbon dioxide separation composition excellent in carbon dioxide desorption efficiency (desorption amount/absorption amount), in which precipitates are less likely to form even if nitrogen oxides are included, and a method for separating carbon dioxide.

Solution to Problem

The present inventors have conducted extensive studies to achieve the above object and as a result, found that a carbon dioxide separation composition containing a specific amine compound is excellent in carbon dioxide desorption efficiency (desorption amount/absorption amount), and precipitates are less likely to form in it even if nitrogen oxides are included, and accomplished the invention.

That is, the present invention provides the following [1] to [8].

[1] A carbon dioxide separation composition, containing at least one amine compound selected from the group consisting of an amine compound represented by the following formula (1):

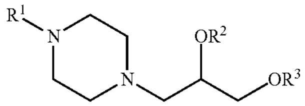

(1)

wherein $R^1$ to $R^3$ each independently represent a hydrogen atom or a $C_{1-4}$ alkyl group, and an amine compound represented by the following formula (2):

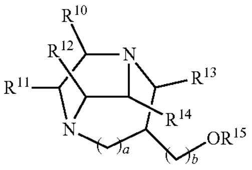

(2)

wherein $R^{10}$, $R^{11}$, $R^{12}$, $R^{13}$ and $R^{14}$ each independently represent a hydrogen atom, a $C_{1-4}$ alkyl group, a hydroxy group, a hydroxymethyl group, a 2-hydroxyethyl group or a $C_{1-4}$ alkoxy group, a and b are each independently 0 or 1 and satisfy the relation a+b=1, and $R^{15}$ is a hydrogen atom, a $C_{1-4}$ alkyl group, a methoxymethyl group, a methoxyethoxymethyl group or a 2-hydroxyethyl group.

[2] The carbon dioxide separation composition according to the above [1], containing a mixture of the amine compound represented by the formula (1) and the amine compound represented by the formula (2).

[3] The carbon dioxide separation composition according to the above [2], wherein the mixing ratio of the amine compound represented by the formula (1) and the amine compound represented by the formula (2) is such that the ratio of the amine compound represented by the formula (2) is from 0.1 to 99.9 parts by weight per 100 parts by weight of the amine compound represented by the formula (1).

[4] The carbon dioxide separation composition according to the above [1] or [2], wherein the amine compound represented by the formula (1) is at least one member selected from the group consisting of 1-(2,3-dihydroxypropyl)-piperazine ($R^1$=$R^2$=$R^3$=hydrogen atom), 1-(2,3-dihydroxypropyl)-4-methylpiperazine ($R^1$=methyl group, $R^2$=$R^3$=hydrogen atom), 1-(2,3-dihydroxypropyl)-4-ethylpiperazine ($R^1$=ethyl group, $R^2$=$R^3$=hydrogen atom), 1-(2,3-dihydroxypropyl)-4-propylpiperazine ($R^1$=propyl group, $R^2$=$R^3$=hydrogen atom), 1-(2,3-dihydroxypropyl)-4-butylpiperazine ($R^1$=butyl group, $R^2$=$R^3$=hydrogen atom), 1-(2-hydroxy-3-methoxypropyl)-piperazine ($R^1$=$R^2$=hydrogen atom, $R^3$=methyl group), 1-(2-hydroxy-3-methoxypropyl)-4-methylpiperazine ($R^1$=methyl group, $R^2$=hydrogen atom, $R^3$=methyl group), 1-(2-hydroxy-3-methoxypropyl)-4-ethylpiperazine ($R^1$=ethyl group, $R^2$=hydrogen atom, $R^3$=methyl group), 1-(2-hydroxy-3-methoxypropyl)-4-propylpiperazine ($R^1$=propyl group, $R^2$=hydrogen atom, $R^3$=methyl group), 1-(2-hydroxy-3-methoxypropyl)-4-butylpiperazine ($R^1$=butyl group, $R^2$=hydrogen atom, $R^3$=methyl group), 1-(2,3-dimethoxypropyl)-piperazine ($R^1$=hydrogen atom, $R^2$=methyl group, $R^3$=methyl group), 1-(2,3-dimethoxypropyl)-4-methylpiperazine ($R^1$=methyl group, $R^2$=methyl group, $R^3$=methyl group), 1-(2,3-dimethoxypropyl)-4-ethylpiperazine ($R^1$=ethyl group, $R^2$=methyl group, $R^3$=methyl group), 1-(2,3-dimethoxypropyl)-4-propylpiperazine ($R^1$=propyl group, $R^2$=methyl group, $R^3$=methyl group) and 1-(2,3-dimethoxypropyl)-4-butylpiperazine ($R^1$=butyl group, $R^2$=methyl group, $R^3$=methyl group).

[5] The carbon dioxide separation composition according to the above [1] or [2], wherein the amine compound represented by the formula (2) is 1,4-diazabicyclo[2.2.2]octane-2-methanol ($R^{10}$=$R^{11}$=$R^{12}$=$R^{13}$=$R^{14}$=$R^{15}$=hydrogen atom, a=0, b=1).

[6] The carbon dioxide separation composition according to the above [1] or [2], which further contains water in a concentration of from 20 to 95 wt % to the total amount of the carbon dioxide separation composition.

[7] The carbon dioxide separation composition according to the above [1] or [2], which further contains water in a concentration of from 30 to 95 wt % to the total amount of the carbon dioxide separation composition.

[8] A method for separating carbon dioxide, which comprises a step of bringing a gas containing carbon dioxide into contact with the carbon dioxide separation composition as defined in any one of the above [1] to [7] to make the carbon dioxide in the gas mixture be absorbed.

Advantageous Effects of Invention

The carbon dioxide separation composition of the present invention has such effects that it has high carbon dioxide desorption efficiency (desorption/absorption) as compared with known materials, recovery/separation of carbon dioxide gas from it at low temperature (with low energy) is possible as compared with known materials, and it can reduce environmental burden (has high energy efficiency).

Further, the carbon dioxide separation composition of the present invention has a high carbon dioxide absorption rate per unit time and has a high desorption rate per unit time as compared with known materials, and is thereby capable of absorbing and separating a large amount of carbon dioxide at high speed. Accordingly, the present invention is industrially very useful in that carbon dioxide discharged in a large amount from e.g. large scale heat power generation can be efficiently absorbed and separated.

Further, the carbon dioxide separation composition of the present invention has such a property that even when a gas containing nitrogen oxides (typically nitrogen dioxide) is blown, precipitates (estimated to be products formed by degeneration of the carbon dioxide separation composition) are less likely to form as compared with known materials. Accordingly, the carbon dioxide separation composition of the present invention has such effects that risks of deposition of solids and clogging of piping in carbon dioxide separation equipment can be reduced, as compared with known materials.

DESCRIPTION OF EMBODIMENTS

Now, the present invention will be described in further detail.

First, the carbon dioxide separation composition of the present invention will be described.

The carbon dioxide separation composition of the present invention contains at least one amine compound selected from the group consisting of the amine compound represented by the formula (1) and the amine compound represented by the formula (2).

In the present invention, at least one amine compound selected from the group consisting of the amine compound represented by the formula (1) and the amine compound represented by the formula (2) has a function to adsorb and desorb carbon dioxide.

The carbon dioxide separation composition of the present invention contains at least one amine compound selected from the group consisting of the amine compound represented by the formula (1) and the amine compound represented by the formula (2), and the carbon dioxide separation composition may be a carbon dioxide separation composition containing the amine compound represented by the formula (1), may be a carbon dioxide separation composition containing the amine compound represented by the formula (2), or may be a carbon dioxide separation composition containing a mixture of the amine compound represented by the formula (1) and the amine compound represented by the formula (2) (containing both the amine compound represented by the formula (1) and the amine compound represented by the formula (2)). However, in view of excellent carbon dioxide separation performance, the carbon dioxide separation composition of the present invention is preferably one containing both the amine compound represented by the formula (1) and the amine compound represented by the formula (2).

In a case where the carbon dioxide separation composition of the present invention contains both the amine compound represented by the formula (1) and the amine compound represented by the formula (2), the mixing ratio of the amine compound represented by the formula (1) and the amine compound represented by the formula (2) is not particularly limited, and in view of excellent carbon dioxide separation performance, the ratio of the amine compound represented by the formula (2) is preferably from 0.1 to 99.9 parts by weight, more preferably from 1 to 90 parts by weight, further preferably from 1 to 75 parts by weight, still more preferably from 5 to 50 parts by weight, particularly preferably from 10 to 30 parts by weight, per 100 parts by weight of the amine compound represented by the formula (1).

In the present invention, $R^1$ to $R^3$ in the formula (1) each independently represent a hydrogen atom or a $C_{1-4}$ alkyl group.

The $C_{1-4}$ alkyl group is not particularly limited and may, for example, be a methyl group, an ethyl group, a propyl group, an isopropyl group, a butyl group, an isobutyl group or a tert-butyl group.

$R^1$ is, in view of excellent carbon dioxide desorption efficiency (desorption amount/absorption amount), preferably a hydrogen atom, a methyl group, an ethyl group or a butyl group, more preferably a hydrogen atom or a methyl group, further preferably a hydrogen atom.

$R^2$ or $R^3$ is, in view of excellent carbon dioxide desorption efficiency (desorption amount/absorption amount), preferably each independently a hydrogen atom, a methyl group, an ethyl group or a butyl group, more preferably each independently a hydrogen atom or a methyl group, further preferably a hydrogen atom.

In the present invention, as specific examples of the amine compound represented by the formula (1), 1-(2,3-dihydroxypropyl)-piperazine ($R^1$=$R^2$=$R^3$=hydrogen atom), 1-(2,3-dihydroxypropyl)-4-methylpiperazine ($R^1$=methyl group, $R^2$=$R^3$=hydrogen atom), 1-(2,3-dihydroxypropyl)-4-ethylpiperazine ($R^1$=ethyl group, $R^2$=$R^3$=hydrogen atom), 1-(2,3-dihydroxypropyl)-4-propylpiperazine ($R^1$=propyl group, $R^2$=$R^3$=hydrogen atom), 1-(2,3-dihydroxypropyl)-4-butylpiperazine ($R^1$=butyl group, $R^2$=$R^3$=hydrogen atom), 1-(2-hydroxy-3-methoxypropyl)-piperazine ($R^1$=$R^2$=hydrogen atom, $R^3$=methyl group), 1-(2-hydroxy-3-methoxypropyl)-4-methylpiperazine ($R^1$=methyl group, $R^2$=hydrogen atom, $R^3$=methyl group), 1-(2-hydroxy-3-methoxypropyl)-4-ethylpiperazine ($R^1$=ethyl group, $R^2$=hydrogen atom, $R^3$=methyl group), 1-(2-hydroxy-3-methoxypropyl)-4-propylpiperazine ($R^1$=propyl group, $R^2$=hydrogen atom, $R^3$=methyl group), 1-(2-hydroxy-3-methoxypropyl)-4-butylpiperazine ($R^1$=butyl group, $R^2$=hydrogen atom, $R^3$=methyl group), 1-(2,3-dimethoxypropyl)-piperazine ($R^1$=hydrogen atom, $R^2$=methyl group, $R^3$=methyl group), 1-(2,3-dimethoxypropyl)-4-methylpiperazine ($R^1$=methyl group, $R^2$=methyl group, $R^3$=methyl group), 1-(2,3-dimethoxypropyl)-4-ethylpiperazine ($R^1$=ethyl group, $R^2$=methyl group, $R^3$=methyl group), 1-(2,3-dimethoxypropyl)-4-propylpiperazine ($R^1$=propyl group, $R^2$=methyl group, $R^3$=methyl group), and 1-(2,3-dimethoxypropyl)-4-butylpiperazine ($R^1$=butyl group, $R^2$=methyl group, $R^3$=methyl group) may be mentioned.

As the amine compound represented by the formula (1), in view of availability, an amine compound represented by the following formula, that is 1-(2,3-dihydroxypropyl)-piperazine (the compound of the formula (1) wherein $R^1$=$R^2$=$R^3$=hydrogen atom, hereinafter sometimes referred to as DHPP) is preferred.

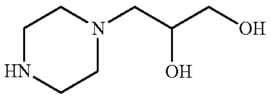 [SMILES: OCC(O)CN1CCNCC1]

In the present invention, the amine compound represented by the formula (1) may be a commercial product or may be synthesized by a known method and is not particularly limited. The purity of the amine compound represented by the formula (1) is not particularly limited and is preferably 95 wt % or higher, particularly preferably 99 wt % or higher.

The above 1-(2,3-dihydroxypropyl)-piperazine may be produced by reacting piperazine and 2,3-dihydroxychloropropane.

In the present invention, $R^{10}$, $R^{11}$, $R^{12}$, $R^{13}$ and $R^{14}$ in the formula (2) each independently represent a hydrogen atom, a $C_{1-4}$ alkyl group, a hydroxy group, a hydroxymethyl group, a 2-hydroxyethyl group or a alkoxy group.

In the present invention, $R^{10}$, $R^{11}$, $R^{12}$, $R^{13}$ and $R^{14}$ in the formula (2) are not particularly limited so long as they are as defined above, and may, for example, be each independently a hydrogen atom, a methyl group, an ethyl group, a n-propyl group, an isopropyl group, a butyl group (a n-butyl group, an isobutyl group, a sec-butyl group, a tert-butyl group), a hydroxy group, a hydroxymethyl group, a 2-hydroxyethyl group, a methoxy group, an ethoxy group, a n-propoxy group, an isopropoxy group, a n-butoxy group or a sec-butoxy group. Among them, in view of excellent carbon dioxide desorption efficiency, they are preferably each independently a hydrogen atom, a methyl group, an ethyl group, a butyl group, a hydroxymethyl group or a methoxy group.

Further, in the present invention, $R^{15}$ in the formula (2) represents a hydrogen atom, a $C_{1-4}$ alkyl group, a methoxymethyl group, a methoxyethoxymethyl group or a 2-hydroxyethyl group.

In the present invention, $R^{15}$ in the formula (2) is not particularly limited so long as it is as defined above, and may, for example, be a hydrogen atom, a methyl group, an ethyl group, a n-propyl group, an isopropyl group, a butyl group (a n-butyl group, an isobutyl group, a sec-butyl group, a tent-butyl group), a methoxymethyl group, a methoxyethoxymethyl group or a 2-hydroxyethyl group. Among them, in view of excellent carbon dioxide desorption efficiency, it is preferably a hydrogen atom, a methyl group, an ethyl group, a butyl group, a methoxymethyl group, a methoxyethoxymethyl group or a 2-hydroxyethyl group.

As specific examples of the amine compound represented by the formula (2), the following compounds (compounds 1 to 28) may be mentioned, however, the present invention is not limited thereto.

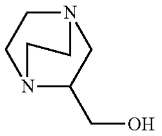

1

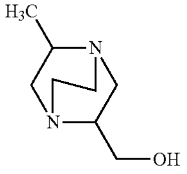

2

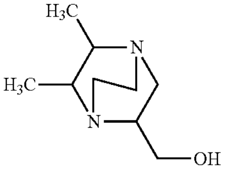

3

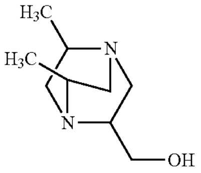

4

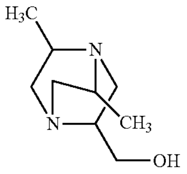

5

6
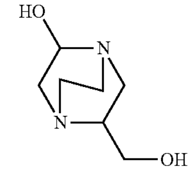
7
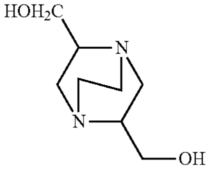
8
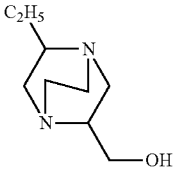
9
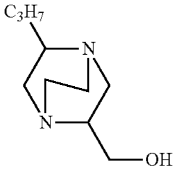
10
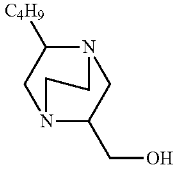
11
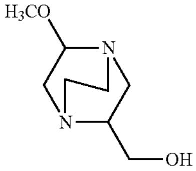
12
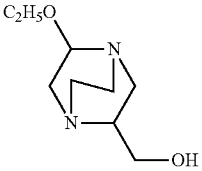
13
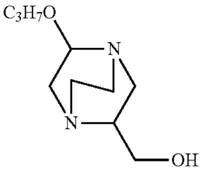
14
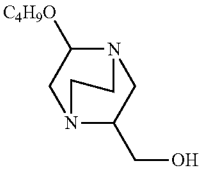
15
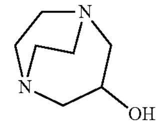
16
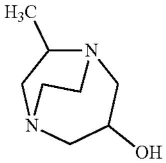
17
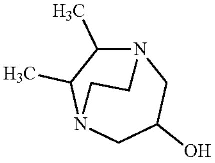
18
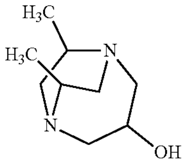
19
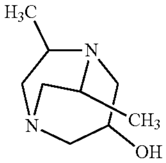
20
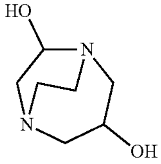
21
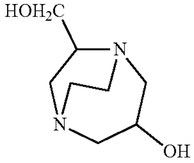
22
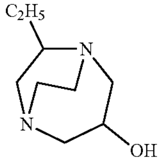
23
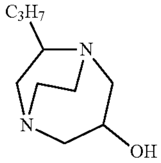

-continued

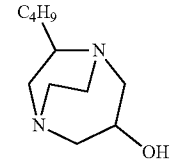

24

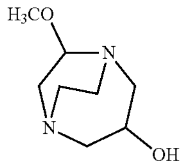

25

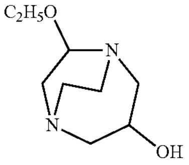

26

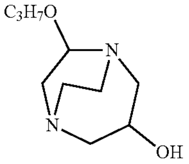

27

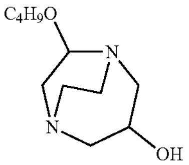

28

In the formula (2), $R^{10}$, $R^{11}$, $R^{12}$, $R^{13}$, $R^{14}$ and $R^{15}$are, in view of excellent carbon dioxide desorption efficiency (desorption amount/absorption amount), preferably each independently a hydrogen atom, a methyl group, an ethyl group or a butyl group, more preferably each independently a hydrogen atom or a methyl group.

Further, $R^{10}$, $R^{11}$, $R^{12}$, $R^{13}$, $R^{14}$ and $R^{15}$ are, in view of availability, more preferably a hydrogen atom.

The amine compound represented by the formula (2) is, in view of availability, preferably 1,4-diazabicyclo[2.2.2]octane-2-methanol ($R^{10}=R^{11}=R^{12}=R^{13}=R^{14}=R^{15}$=hydrogen atom, a=0, b=1, the above compound 1, hereinafter sometimes referred to as DABCOM).

In the present invention, the amine compound represented by the formula (2) may be commercial product or may be synthesized by a known method, and is not particularly limited. Further, the purity of the amine compound represented by the formula (2) is not particularly limited and is preferably 95% or higher, particularly preferably 99% or higher. If the purity is lower than 95%, the carbon dioxide absorption amount may decrease.

The amine compound represented by the formula (2) is not particularly limited and may be produced, for example, by cyclization of a dihydroxyalkylpiperazine (for example, 2,3-dihydroxypropylpiperazine) (for example, JP-A-2010-37325).

The carbon dioxide separation composition containing at least one amine compound selected from the group consisting of the amine compound represented by the formula (1) and the amine compound represented by the formula (2) of the present invention may further contain, within a range where the effects of the present invention are obtained, at least one amine compound (A) different from the above amine compounds, selected from the group consisting of an alkanolamine, a propylenediamine, a piperazine, a piperidine, a morpholine, a pyrrolidine, an azepane and a polyethylenediamine. By incorporating the alkanolamine, the propylenediamine, the piperazine, the piperidine, the morpholine, the pyrrolidine, the azepane and the polyethylenediamine, such effects are expected that the N atom content per unit weight of the carbon dioxide separation composition can be increased and thus the carbon dioxide absorption amount per unit weight of the carbon dioxide separation composition can be increased.

As specific examples of the alkanolamine, ethanolamine, N-methylethanolamine, N,N-dimethylethanolamine, diethanolamine, N-methyldiethanolamine, N-(2-aminoethyl)ethanolamine, N-[2-(dimethylamino)ethyl], N-methylethanolamine, N-[2-(diethylamino)ethyl], N-ethylethanolamine, 2-(2-aminoethoxy)ethanol, 2-[2-(dimethylamino)ethoxy]ethanol, 2-[2-(diethylamino)ethoxy]ethanol, N-[2-(2-aminoethoxy)ethyl]ethanolamine, N-[2-{2-(dimethylamino)ethoxy}ethyl], N-methylethanolamine, and N-[2-{2-(diethylamino)ethoxy}ethyl], N-ethylethanolamine may be mentioned. In view of availability and the production cost, the alkanolamine is preferably at least one member selected from the group consisting of ethanolamine, N-methyldiethanolamine, N-(2-aminoethyl)ethanolamine and 2-(2-aminoethoxy)ethanol.

As specific examples of the propylenediamine, 1,3-propanediamine, 3-(dimethylamino)propylamine, 3-(diethylamino)propylamine, 1,3-bis(dimethylamino)propane and 1,3-bis(diethylamino)propane may be mentioned. Among them, in view of availability and the production cost, the propylenediamine is preferably at least one member selected from the group consisting of 1,3-propanediamine and 3-(dimethylamino)propylamine.

As specific examples of the piperazine, piperazine, 2-methylpiperazine, 1-(2-hydroxyethyl)-piperazine, 1-(2,3-dihydroxypropyl)-piperazine, 1-(2-hydroxyethyl)-4-methylpiperazine, 1-(2,3-dihydroxypropyl)-4-methylpiperazine, 1-(2,3-dihydroxypropyl)-4-ethylpiperazine, 1-(2,3-dihydroxypropyl)-4-propylpiperazine, 1-(2,3-dihydroxypropyl)-4-butylpiperazine, 1-(2-hydroxy-3-methoxypropyl)-piperazine, 1-(2-hydroxy-3-methoxypropyl)-4-methylpiperazine, 1-(2-hydroxy-3-methoxypropyl)-4-ethylpiperazine, 1-(2-hydroxy-3-methoxypropyl)-4-propylpiperazine, 1-(2-hydroxy-3-methoxypropyl)-4-butylpiperazine, 1-(2,3-dimethoxypropyl)-piperazine, 1-(2,3-dimethoxypropyl)-4-methylpiperazine, 1-(2,3-dimethoxypropyl)-4-ethylpiperazine, 1-(2,3-dimethoxypropyl)-4-propylpiperazine, 1-(2,3-dimethoxypropyl)-4-butylpiperazine, 1,4-bis(2-hydroxyethyl)-piperazine, 1,4-bis(2,3-dihydroxypropyl)-piperazine and 1,4-diazabicyclo[2.2.2]octane may be mentioned.

As specific examples of the piperidine, piperidine, 2-methylpiperidine, 1-(2,3-dihydroxypropyl)-piperidine, 1-(2,3-dihydroxypropyl)-4-methylpiperidine, 1-(2,3-dihydroxypropyl)-4-ethylpiperidine, 1-(2,3-dihydroxypropyl)-4-propylpiperidine, 1-(2,3-dihydroxypropyl)-4-butylpiperidine, 1-(2-hydroxy-3-methoxypropyl)-piperidine, 1-(2-hydroxy-3-methoxypropyl)-4-methylpiperidine, 1-(2-hydroxy-3-methoxypropyl)-4-ethylpiperidine, 1-(2-hydroxy-3-methoxypropyl)-4-propylpiperidine, 1-(2-hydroxy-3-methoxypropyl)-4-butylpiperidine, 1-(2,3-dimethoxypropyl)-piperidine, 1-(2,3-dimethoxypropyl)-4-methylpiperidine, 1-(2,3-dimethoxypropyl)-4- ethylpiperidine, 1-(2,3-dimethoxypropyl)-4-propylpiperidine and 1-(2,3-dimethoxypropyl)-4-butylpiperidine may be mentioned.

As specific examples of the morpholine, morpholine, 2-methylmorpholine, 2,6-dimethylmorpholine, 1-(2,3-dihydroxypropyl)-morpholine, 1-(2-hydroxy-3-methoxypropyl)-morpholine and 1-(2,3-dimethoxypropyl)-morpholine may be mentioned.

As specific examples of the pyrrolidine, pyrrolidine, 2-methylpyrrolidine, 2,5-dimethylpyrrolidine, 1-(2,3-dihydroxypropyl)-pyrrolidine, 1-(2-hydroxy-3-methoxypropyl)-pyrrolidine, 1-(2,3-dimethoxypropyl)-pyrrolidine and 1,5-diazabicyclo[4.3.0]-5-nonene may be mentioned.

As specific examples of the azepane, azepane, 2-methylazepane, 2,7-dimethylazepane and 1,8-diazabicyclo[5.4.0]-7-undecene may be mentioned.

As specific examples of the polyethylenediamine, diethylenetriamine (DETA), triethylenetetramine (TETA), tetraethylenepentamine (TEPA), pentaethylenehexamine (PEHA), hexaethyleneheptamine (HEHA), and a polyethylenepolyamine having 8 or more amino groups may be mentioned.

"TETA" means a compound having 4 amino groups connected linearly or in branches via ethylene groups, and in the present invention, includes one having 4 amino groups and having a piperazine cyclic structure. As specific compound names of TETA, for example, 1,4,7,10-tetraazadecane, N,N-bis(2-aminoethyl)-1,2-ethanediamine, 1-[2-[(2-aminoethyl)amino]ethyl]-piperazine and 1,4-bis(2-aminoethyl)-piperazine may be mentioned.

Further, "TEPA" means a compound having 5 amino groups connected linearly or in branches via ethylene groups, and in the present invention, includes one having five amino groups and having a piperazine cyclic structure. As specific compound names of TEPA, for example, 1,4,7,10,13-pentaazatridecane, N,N,N'-tris(2-aminoethyl)-1,2-ethanediamine, 1-[2-[2-[2-[(2-aminoethyl)amino]ethyl]amino]ethyl]-piperazine, 1-[2-[bis(2-aminoethyl)amino]ethyl]-piperazine and bis[2-(1-piperazinyl)ethyl]amine may be mentioned.

Further, "PEHA" means a compound having 6 amino groups connected linearly or in branches via ethylene groups, and in the present invention, includes one having 6 amino groups and having a piperazine cyclic structure. As specific compound names of PEHA, for example, 1,4,7,10,13,16-hexaazahexadecane, N,N,N',N'-tetrakis(2-aminoethyl)-1,2-ethanediamine, N,N-bis(2-aminoethyl)-N'-[2-[(2-aminoethyl)amino]ethyl]-1,2-ethanediamine, 1-[2-[2-[2-[2-[2-[(2-aminoethyl)amino]ethyl]amino]ethyl]amino]ethyl]-piperazine, 1-[2-[2-[2-[bis(2-aminoethyl)amino]ethyl]amino]ethyl]-piperazine, and N,N'-bis[2-(1-piperazinyl)ethyl]-1,2-ethanediamine may be mentioned.

Further, "HEHA" means a compound having 7 amino groups connected linearly or in branches via ethylene groups, and in the present invention, includes one having 7 amino groups and having a piperazine cyclic structure. As specific compound names of HEHA, for example, 1,4,7,10,13,16,19-heptaazanonadecane, N-[2-[(2-aminoethyl)amino]ethyl]-N,N',N'-tris(2-aminoethyl)-1,2-ethanediamine, 1-[2-[2-[2-[2-[2-[2-[(2-aminoethyl)amino]ethyl]amino]ethyl]amino]ethyl]amino]ethyl]-piperazine and N-(2-aminoethyl)-N,N'-bis[2-(1-piperazinyl)ethyl]-1,2-ethanediamine may be mentioned.

Further, the "polyethylenepolyamine having 8 or more amino groups" means a compound having 8 or more amino groups connected linearly or in branches via ethylene groups, and in the present invention, includes one having 8 or more amino groups and having a piperazine cyclic structure. As specific compound names of the polyethylenepolyamine having 8 or more amino groups, for example, "Poly8" tradename, manufactured by Tosoh Corporation, and polyethyleneimine may be mentioned.

Among them, in view of availability and the cost, as the polyethylenepolyamine, preferred is at least one member selected from the group consisting of diethylenetriamine (DETA),

- a triethylenetetramine (TETA) comprising a mixture of 1,4,7,10-tetraazadecane, N,N-bis(2-aminoethyl)-1,2-ethanediamine, 1-[2-[(2-aminoethyl)amino]ethyl]-piperazine and 1,4-bis(2-aminoethyl)-piperazine,
- a tetraethylenepentamine (TEPA) comprising a mixture of 1,4,7,10,13-pentaazatridecane, N,N,N'-tris(2-aminoethyl)-1,2-ethanediamine, 1-[2-[2-[2-[(2-aminoethyl)amino]ethyl]amino]ethyl]-piperazine, 1-[2-[bis(2-aminoethyl)amino]ethyl]-piperazine and bis[2-(1-piperazinyl)ethyl]amine,
- a pentaethylenehexamine (PEHA) comprising a mixture of 1,4,7,10,13,16-hexaazahexadecane, N,N,N',N'-tetrakis(2-aminoethyl)-1,2-ethanediamine, N,N-bis(2-aminoethyl)-N'-[2-[(2-aminoethyl)amino]ethyl]-1,2-ethanediamine, 1-[2-[2-[2-[2-[2-[(2-aminoethyl)amino]ethyl]amino]ethyl]amino]ethyl]-piperazine, 1-[2-[2-[2-[bis(2-aminoethyl)amino]ethyl]amino]ethyl]-piperazine and N,N'-bis[2-(1-piperazinyl)ethyl]-1,2-ethanediamine,
- a hexaethyleneheptamine (HEHA) comprising a mixture of 1,4,7,10,13,16,19-heptaazanonadecane, N-[2-[(2-aminoethyl)amino]ethyl)-N,N',N'-tris(2-aminoethyl)-1,2-ethanediamine, 1-[2-[2-[2-[2-[2-[2-[(2-aminoethyl)amino]ethyl]amino]ethyl]amino]ethyl]amino]ethyl]-piperazine and N-(2-aminoethyl)-N,N'-bis[2-(1-piperazinyl)ethyl]-1,2-ethanediamine, and "Poly8", tradename, manufactured by Tosoh Corporation.

In the present invention, the alkanolamine, the propylenediamine, the piperazine, the piperidine, the morpholine, the pyrrolidine, the azepane and the polyethylenepolyamine may be commercial products or may be synthetized by a known method and are not particularly limited. Further, the purity of each of the alkanolamine, the propylenediamine, the piperazine, the piperidine, the morpholine, the pyrrolidine, the azepane and the polyethylenepolyamine is not particularly limited and is preferably 95 wt % or higher, particularly preferably 99 wt % or higher.

In a case where the carbon dioxide separation composition of the present invention contains both at least one amine compound selected from the group consisting of the amine compound represented by the formula (1) and the amine compound represented by the formula (2) and at least one amine compound (A) selected from the group consisting of the alkanolamine, the propylenediamine, the piperazine, the piperidine, the morpholine, the pyrrolidine, the azepane and the polyethylenepolyamine, their weight ratio is not particularly limited so long as the effects of the present invention are obtained. The weight ratio is, with a view to increasing the carbon dioxide absorption amount per unit weight, such that the content of the amine compound (A) is preferably from 0.1 to 99.9 parts by weight, more preferably from 0.5 to 90 parts by weight, further preferably from 1 to 75 parts by weight, still more preferably from 1 to 50 parts by weight, particularly preferably from 5 to 40 parts by weight, per 100 parts by weight of at least one amine compound selected from the group consisting of the amine compound represented by the formula (1) and the amine compound represented by the formula (2).

The carbon dioxide separation composition of the present invention may be used as it is for its application, however, in view of operation property, it is usually used preferably as a solution further containing a solvent. The solvent used for the carbon dioxide separation composition is not particularly limited and may, for example, be water, an alcohol compound, a polyol compound (not particularly limited and for example, ethylene glycol, glycerin or polyethylene glycol), or a mixture thereof. Among them, in view of excellent efficiency to absorb and separate the carbon dioxide gas as a bicarbonate, water is preferred.

In a case where the carbon dioxide separation composition of the present invention contains the above solvent (for example, water), the concentration of the solvent is, in view of excellent operation property of the carbon dioxide separation composition, to the total amount of the carbon dioxide separation composition, preferably from 20 to 95 wt %, more preferably from 30 to 95 wt %, further preferably from 30 to 85 wt %, particularly preferably from 40 to 75 wt %.

Further, the carbon dioxide separation composition of the present invention is, in view of excellent durability to nitrogen oxides, preferably a composition comprising only at least one amine compound selected from the group consisting of the amine compound represented by the formula (1) and the amine compound represented by the formula (2), and water. In such a case, the preferred ranges of the compounds and the preferred range of the composition are as described above.

In the carbon dioxide separation composition containing at least one amine compound selected from the group consisting of the amine compound represented by the formula (1) and the amine compound represented by the formula (2), the at least one amine compound selected from the group consisting of the amine compound represented by the formula (1) and the amine compound represented by the formula (2), is preferably the amine compound represented by the formula (1), in that the carbon dioxide absorption rate and absorption amount are increased. That is, preferred is the carbon dioxide separation composition containing the amine compound represented by the formula (1). For example, more specifically, the amine compound represented by the formula (1) is dissolved in a solvent such as water, whereby a preferred carbon dioxide separation composition is prepared.

Now, the carbon dioxide separation composition containing the amine compound represented by the formula (1) will be described.

In the carbon dioxide separation composition containing the amine compound represented by the formula (1), the amine compound represented by the formula (1) plays a role to adsorb and desorb carbon dioxide.

In the carbon dioxide separation composition containing the amine compound represented by the formula (1), the definition, the preferred range, the production method and the like of the amine compound represented by the formula (1) are as described above.

The carbon dioxide separation composition containing the amine compound represented by the formula (1) may further contain, within a range where the effects of the present invention are obtained, in addition to the amine compound represented by the formula (1), at least one amine compound (A') selected from the group consisting of an alkanolamine, a propylenediamine and a polyethylenepolyamine. The definitions and the preferred ranges of the propylenediamine and the polyethylenepolyamine in the amine compound (A') are as defined above. Further, the definition and the preferred range of the alkanolamine in the amine compound (A') are as described hereinafter. In this case, the amine compound (A') does not include the amine compound represented by the formula (1). By incorporating the alkanolamine, the propylenediamine or the polyethylenepolyamine, such effects can be expected that the N atom content per unit weight of the carbon dioxide separation composition can be increased, and the carbon dioxide absorption amount per unit weight of the carbon dioxide separation composition can be increased.

In the carbon dioxide separation composition containing the amine compound represented by the formula (1), as specific examples of the alkanolamine, ethanolamine, N-methylethanolamine, N,N-dimethylethanolamine, diethanolamine, N-methyldiethanolamine, N-(2-aminoethyl)ethanolamine, N-[2-(dimethylamino)ethyl], N-methylethanolamine, N-[2-(diethylamino)ethyl], N-ethylethanolamine, 2-(2-aminoethoxy)ethanol, 2-[2-(dimethylamino)ethoxy]ethanol, 2-[2-(diethylamino)ethoxy]ethanol, N-[2-(2-aminoethoxy)ethyl]ethanolamine, N-[2-{2-(dimethylamino)ethoxy}ethyl], N-methylethanolamine, N-[2-{2-(diethylamino)ethoxy}ethyl], N-ethylethanolamine, and an amine compound represented by the following formula (2) may be mentioned.

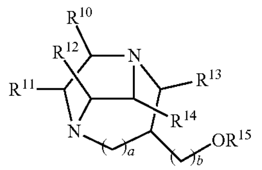

(2)

wherein $R^{10}$, $R^{11}$, $R^{12}$, $R^{13}$ and $R^{14}$ each independently represent a hydrogen atom, a $C_{1-4}$ alkyl group, a hydroxy group, a hydroxymethyl group, a 2-hydroxyethyl group or a $C_{1-4}$ alkoxy group, a and b are each independently 0 or 1 and satisfy the relation a+b=1, $R^{15}$ represents a hydrogen atom, a $C_{1-4}$ alkyl group, a methoxymethyl group, a methoxyethoxymethyl group or a 2-hydroxyethyl group.

Among them, in view of availability and the production cost, the alkanolamine is preferably at least one member selected from the group consisting of ethanolamine, N-methyldiethanolamine, N-(2-aminoethyl)ethanolamine, 2-(2-aminoethoxy)ethanol and the amine compound represented by the formula (2).

The definition and the preferred range of the amine represented by the formula (2) are the same as the definition and the preferred range of the amine represented by the formula (2), and are described again as follows.

$R^{10}$ $R^{11}$, $R^{12}$, $R^{13}$ and $R^{14}$ in in the formula (2) are not particularly limited so long as they are as defined above, and they may, for example, be each independently a hydrogen atom, a methyl group, an ethyl group, a n-propyl group, an isopropyl group, a butyl group (a n-butyl group, an isobutyl group, a sec-butyl group, a tert-butyl group), a hydroxy group, a hydroxymethyl group, a 2-hydroxyethyl group, a methoxy group, an ethoxy group, a n-propoxy group, an isopropoxy group, a n-butoxy group or a sec-butoxy group. Among them, in view of excellent carbon dioxide desorption efficiency, they are preferably each independently a hydrogen atom, a methyl group, an ethyl group, a butyl group, a hydroxymethyl group or a methoxy group.

Further, $R^{15}$ in the formula (2) is not particularly limited so long as it is as defined above, and may, for example, be a hydrogen atom, a methyl group, an ethyl group, a n-propyl group, an isopropyl group, a butyl group (a n-butyl group, an isobutyl group, a sec-butyl group, a tert-butyl group), a methoxymethyl group, a methoxyethoxymethyl group or a 2-hydroxyethyl group. Among them, in view of excellent carbon dioxide desorption efficiency, it is preferably a hydrogen atom, a methyl group, an ethyl group, a butyl group, a methoxymethyl group, a methoxyethoxymethyl group or a 2-hydroxyethyl group.

As specific examples of the amine compound represented by the formula (2), the following compounds (compounds 1 to 28) may be mentioned, however, the present invention is by no means restricted thereto.

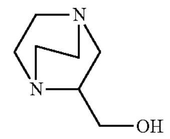
1

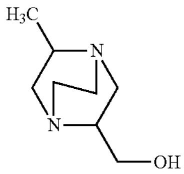
2

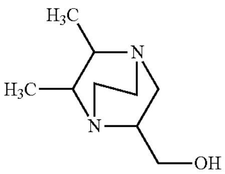
3

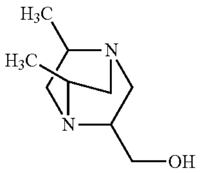
4

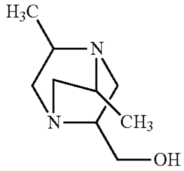
5

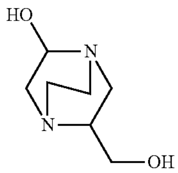
6

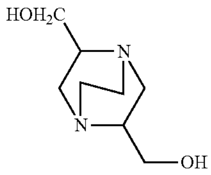
7

-continued

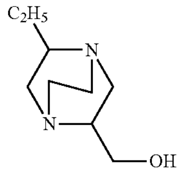
8

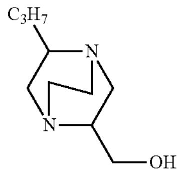
9

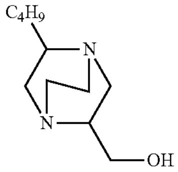
10

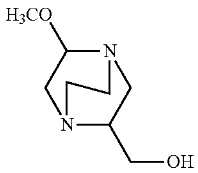
11

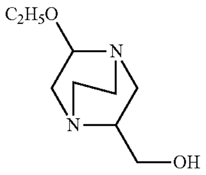
12

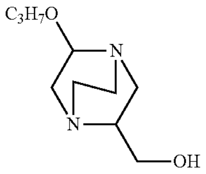
13

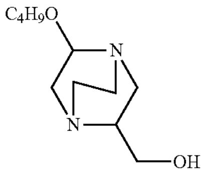
14

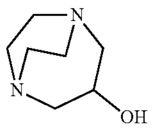
15

16

-continued

17

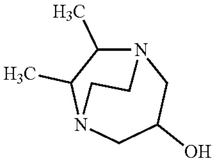

18

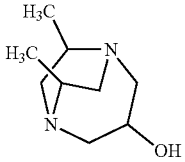

19

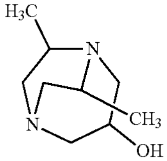

20

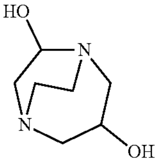

21

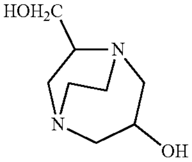

22

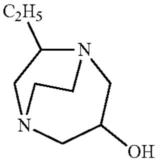

23

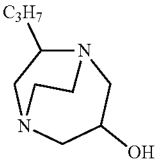

24

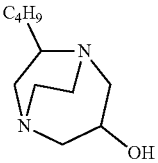

25

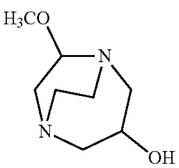

-continued

26

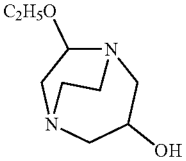

27

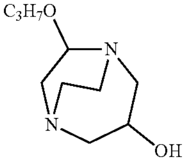

28

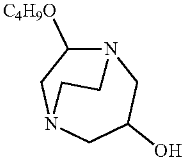

$R^{10}$, $R^{11}$, $R^{12}$, $R^{13}$, $R^{14}$ and $R^{15}$ are, in view of excellent carbon dioxide desorption efficiency (desorption amount/absorption amount), preferably each independently a hydrogen atom, a methyl group, an ethyl group or a butyl group, more preferably each independently a hydrogen atom or a methyl group.

$R^{10}$, $R^{11}$, $R^{12}$, $R^{13}$, $R^{14}$ and $R^{15}$ are, in view of availability, more preferably a hydrogen atom.

The amine compound represented by the formula (2) is, in view of availability, preferably 1,4-diazabicyclo[2.2.2]octane-2-methanol ($R^{10}$=$R^{11}$=$R^{12}$=$R^{13}$=$R^{14}$=$R^{15}$=hydrogen atom, a=0, b=1), that is the above compound 1.

In the carbon dioxide separation composition containing the amine compound represented by the formula (1), the alkanolamine, the propylenediamine and the polyethylenepolyamine may be commercial products or may be synthesized by a known method and are not particularly limited. The purity of each of the alkanolamine, the propylenediamine and the polyethylenepolyamine is not particularly limited and is preferably 95 wt % or higher, particularly preferably 99 wt % or higher.

In a case where the carbon dioxide separation composition containing the amine compound represented by the formula (1) contains both the amine compound represented by the formula (1) and at least one amine compound (A') selected from the group consisting of the alkanolamine, the propylenediamine and the polyethylenepolyamine, their weight ratio is not particularly limited. The weight ratio is, with a view to increasing the carbon dioxide absorption amount per unit weight, such that the amine compound (A') content is preferably from 0.1 to 99.9 parts by weight, more preferably from 0.5 to 90 parts by weight, further preferably from 1 to 75 parts by weight, still more preferably from 1 to 50 parts by weight, particularly preferably from 5 to 40 parts by weight, per 100 parts by weight of the amine compound represented by the formula (1).

The carbon dioxide separation composition containing the amine compound represented by the formula (1) may be used as it is for its application, however, in view of operation property, it is usually used preferably as a solution further containing a solvent. The solvent used for the carbon dioxide separation composition is not particularly limited and may, for example, be water, an alcohol compound, a polyol compound (not particularly limited and for example, ethylene glycol, glycerin or polyethylene glycol), or a mixture thereof. Among them, in view of excellent efficiency to absorb and separate the carbon dioxide gas as a bicarbonate, in view of excellence in suppression of viscosity increase of an absorbing agent and a separating agent and solid content formation, and in that the carbon dioxide diffusion energy will not be so high, water is preferred.

In a case where the above solvent (for example, water) is used, the concentration of the solvent is, in view of excellent operation property of the carbon dioxide separation composition containing the amine compound represented by the formula (1), to the total amount of the carbon dioxide separation composition, preferably from 20 to 95 wt %, more preferably from 30 to 95 wt %, further preferably from 30 to 85 wt %, particularly preferably from 40 to 75 wt %.

In the carbon dioxide separation composition containing at least one amine compound selected from the group consisting of the amine compound represented by the formula (1) and the amine compound represented by the formula (2), the at least one amine compound selected from the group consisting of the amine compound represented by the formula (1) and the amine compound represented by the formula (2), is preferably the amine compound represented by the formula (2), in that desorption of carbon dioxide is promoted, and the desorption efficiency (carbon dioxide desorption amount/carbon dioxide absorption amount) is increased. That is, preferred is the carbon dioxide separation composition containing the amine compound represented by the formula (2). For example, more specifically, the amine compound represented by the formula (2) is dissolved in a solvent such as water, whereby a preferred carbon dioxide separation composition is prepared.

Now, the carbon dioxide separation composition containing the amine compound represented by the formula (2) will be described.

In the carbon dioxide separation composition containing the amine compound represented by the formula (2), the amine compound represented by the formula (2) plays a role to promote desorption of carbon dioxide and to increase the desorption efficiency (carbon dioxide desorption amount/carbon dioxide absorption amount).

In the carbon dioxide separation composition containing the amine compound represented by the formula (2), the definition, the preferred range, the production method and the like of the amine compound represented by the formula (2) are as described above.

The carbon dioxide separation composition containing the amine compound represented by the formula (2) may further contain, within a range where the effects of the present invention are obtained, in addition to the amine compound represented by the formula (2), at least one amine compound (A) selected from the group consisting of an alkanolamine, a propylenediamine, a piperazine, a piperidine, a morpholine, a pyrrolidine, an azepane and a polyethylenepolyamine. The definition and the preferred range of the amine compound (A) are as defined above. In this case, the amine compound (A) does not include the amine compound represented by the formula (2). By incorporating the amine compound (A), such effects can be expected that the N atom content per unit weight of the carbon dioxide separation composition can be increased, and the carbon dioxide absorption amount per unit weight of the carbon dioxide separation composition can be increased.

The amine compound (A) which may be contained in the carbon dioxide separation composition containing the amine compound represented by the formula (2) may be a commercial product or may be synthesized by a known method and is not particularly limited. The purity of the amine compound (A) is not particularly limited and is preferably 95% or higher, particularly preferably 99% or higher. If the purity is lower than 95%, the carbon dioxide absorption amount may be lowered.

In a case where the carbon dioxide separation composition containing the amine compound represented by the formula (2) contains the amine compound (A), the weight ratio of the amine compound represented by the formula (2) and the amine compound (A) is not particularly limited. With a view to increasing the carbon dioxide absorption amount per unit weight, the weight percentage of the amine compound represented by the formula (2) (assuming the total of the amine compound represented by the formula (2) and the amine compound (A) as 100%) is preferably from 50 to 99.9 wt %, more preferably from 80 to 99 wt %.

The carbon dioxide separation composition containing the amine compound represented by the formula (2) may be used as it is for its application, or, in view of operation property, it may be used as a composition further containing a solvent. The solvent used for the carbon dioxide separation composition is not particularly limited and may, for example, be water, an alcohol compound, a polyol compound (not particularly limited and for example, ethylene glycol, glycerin or polyethylene glycol), or a mixture thereof. Among them, in view of excellent efficiency to absorb and separate the carbon dioxide gas as a bicarbonate, in view of excellence in suppression of viscosity increase of an absorbing agent and a separating agent and solid content formation, and in that the carbon dioxide diffusion energy will not be so high, water is preferred.

In a case where the solvent (for example, water) is used, the concentration of the solvent is, in view of excellent operation property of the carbon dioxide separation composition containing the amine compound of the formula (2), to the total amount of the carbon dioxide separation composition, preferably from 20 to 95 wt %, more preferably from 30 to 95 wt %, further preferably from 30 to 85 wt %, particularly preferably from 50 to 80 wt %.

Now, the method for separating carbon dioxide by using the carbon dioxide separation composition of the present invention will be described.

The method for separating carbon dioxide of the present invention comprises a step of bringing a gas containing carbon dioxide into contact with the carbon dioxide separation composition so that the carbon dioxide is highly selectively absorbed in the carbon dioxide separation composition, and the method may further has, after absorption in such a manner, a step of heating and/or exposing the carbon dioxide separation composition to a reduced pressure environment so that the absorbed carbon dioxide is desorbed.

In the method for separating carbon dioxide of the present invention, the method of bringing the gas containing carbon dioxide into contact with the carbon dioxide separation composition is not particularly limited and a known method may be employed. The known method may, for example, be bubbling method, or countercurrent contact method using a packed column or a plate column.

In the method for separating carbon dioxide of the present invention, the temperature at which the gas containing carbon dioxide is absorbed in the carbon dioxide separation composition is not particularly limited and is usually within a range of from 0° C. to 50° C.

In the method for separating carbon dioxide of the present invention, the temperature at which carbon dioxide is desorbed from the carbon dioxide separation composition is not particularly limited and is usually within a range of from 60 to 150° C. However, in view of energy saving, it is preferably 100° C. or lower.

Further, the carbon dioxide separation composition may be used for carbon dioxide chemical absorption method as a carbon dioxide absorbing/desorbing agent.

The chemical absorption method is a method of bringing the carbon dioxide separation composition and the gas containing carbon dioxide into contact with each other to make the carbon dioxide be absorbed, and exposing the carbon dioxide separation composition to high temperature or reduced pressure to make the absorbed carbon dioxide be desorbed. On that occasion, the temperature at which the carbon dioxide is desorbed is not particularly limited, and may, for example, be 60° C. or higher, and in view of excellent desorption efficiency, preferably 80° C. or higher, more preferably 90° C. or higher, particularly preferably 100° C. or higher.

Further, the carbon dioxide separation composition may be used as a carbon dioxide absorbing/desorbing agent as supported on a carrier.

The carrier is not particularly limited and may, for example, be silica, alumina, magnesia, porous glass, activated carbon or polymethyl methacrylate-based porous resin or fibers.

Silica may, for example, be crystalline silica, non-crystalline (amorphous) silica or silica having pores (for example, mesoporous silica). For the carbon dioxide absorbing/desorbing agent, silica to be used is not particularly limited and industrially distributed silica may be used, and silica having a large surface area is preferred.

The amount of the carbon dioxide separation composition in the carbon dioxide absorbing/desorbing agent is, in view of excellent carbon dioxide absorption amount and supporting operation of the carbon dioxide separation composition, preferably from 5 to 70 parts by weight, more preferably from 10 to 60 parts by weight, per 100 parts by weight of the carrier.

The carbon dioxide absorbing/desorbing agent may further contain water.

The carbon dioxide absorbing/desorbing agent is applicable to carbon dioxide separating method widely known as a solid absorbing method. The solid absorbing method means a method of bringing the carbon dioxide absorbing/desorbing agent and the gas containing carbon dioxide into contact with each other to make the carbon dioxide be absorbed in the carbon dioxide absorbing/desorbing agent, and then heating or exposing the carbon dioxide absorbing/desorbing agent to reduced pressure environment to make the absorbed carbon dioxide be desorbed. The temperature at which the carbon dioxide is desorbed is not particularly limited and may, for example, be 60° C. or higher, and in view of excellent desorption efficiency, preferably 80° C. or higher, more preferably 90° C. or higher, particularly preferably 100° C. or higher.

The gas containing carbon dioxide may be pure carbon dioxide gas or may be a gas mixture containing carbon dioxide and other gas. Such other gas is not particularly limited and may, for example, be the air, nitrogen, oxygen, hydrogen, argon, neon, helium, carbon monoxide, water vapor, methane or nitrogen oxides.

The gas mixture applicable to the method for separating carbon dioxide of the present invention is not particularly limited so long as it is a gas mixture containing carbon dioxide, and so as to improve the performance to separate the carbon dioxide from other gas, preferably one having a carbon dioxide concentration of 5 vol % or higher, more preferably 10 vol % or higher.

In the method for separating carbon dioxide of the present invention, a step other than the above steps (absorbing step and desorbing step) may further be conducted without any problem. For example, a cooling step, a heating step, a washing step, an extraction step, an ultrasonic treatment step, a distillation step and a treatment step with a chemical, may properly be conducted.

The method for separating carbon dioxide of the present invention is not particularly limited and is applicable, for example, to separation of carbon dioxide ($CO_2$) from combustion exhaust gas generated from e.g. heat power plants, steel plants and cement factories, and separation of carbon dioxide ($CO_2$) from steam reformed gas obtained in steam reforming process.

EXAMPLES

Now, the present invention will be described in further detail with reference to Examples. However, it should be understood that the present invention is by no means restricted to such specific Examples.

<Method of Measuring Efficiency for Desorption of Carbon Dioxide Gas>

100 g of a carbon dioxide absorbing solution prepared in the after-described Examples (put in a gas absorbing bottle having a capacity of 200 mL) was adjusted to a temperature of 40° C. in a water bath. To the carbon dioxide absorbing solution, a gas mixture (500 mL/min) of carbon dioxide gas at 100 mL/min and nitrogen gas at 400 mL/min was blown by bubbling for 1 hour. The carbon dioxide gas absorption amount ($CO_2$ absorption amount (L) in one hour) was measured by a gas flow meter and a carbon dioxide concentration meter. From the $CO_2$ absorption amount (L) in one hour, the $CO_2$ absorption amount (L) per kg of the carbon dioxide absorbing solution was calculated.

Then, the carbon dioxide absorbing solution was adjusted to a temperature of 70° C. in a water bath To the carbon dioxide absorbing solution, nitrogen gas at 500 mL/min was blown by bubbling for 2 hours. The carbon dioxide gas desorption amount ($CO_2$ desorption amount (L) in two hours) was measured by a gas flow meter and a carbon dioxide concentration meter. From the $CO_2$ desorption amount (L) in two hours, the $CO_2$ desorption amount (L) per kg of the carbon dioxide absorbing solution was calculated.

From the $CO_2$ desorption amount (L) in two hours and the $CO_2$ absorption amount (L) in one hour, the carbon dioxide gas desorption efficiency (=$CO_2$ desorption amount (L) in two hours/$CO_2$ absorption amount (L) in one hour) was calculated.

<Method to Conform Whether Precipitates Formed Due to Nitrogen Oxides>

100 g of a carbon dioxide absorbing solution prepared in the after-described Examples (put in a gas absorbing bottle having a capacity of 200 mL) was adjusted to a temperature of 30° C. in an oil bath. To the carbon dioxide absorbing solution, a gas mixture (666 mL/min) of carbon dioxide gas at 650 mL/min, nitrogen gas at 15.7 mL/min and nitrogen dioxide ($NO_2$) gas at 0.32 mL/min was blown by bubbling for 32 hours. The carbon dioxide absorbing solution was heated in an oil bath at 105° C. and subjected to reflux for 1 hour. Then, the carbon dioxide absorbing solution was cooled to 30° C., and water lost at the time of reflux was supplemented. The above operation comprising blowing the gas for 32 hours, heat reflux, and cooling and supplement of water, was conducted repeatedly totally 7 times, and the content in the gas absorbing bottle was visually confirmed.

<Materials Used for Evaluation>

Regarding compounds used in the following experiment, abbreviated names and their structures are shown.

PIP: piperazine (manufactured by Sigma-Aldrich)

DHPP: 1-(2,3-dihydroxypropyl)-piperazine (manufactured by Sigma-Aldrich)

DABCOM: 1.4-diazabicyclo[2,2,2]octane-2-methanol (manufactured by Tosoh Corporation)

MDEA: N-methyldiethanomine (manufactured by FUJIFILM Wako Pure Chemical Corporation)

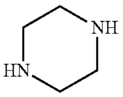

PIP

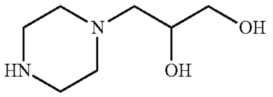

DHPP

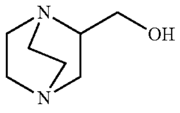

DABCOM

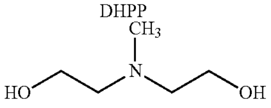

MDEA

Example 1

70 g of pure water was added to 30 g of DHPP, and mixed and stirred to prepare a carbon dioxide absorbing solution (100 g), which was put in a 200 mL gas absorbing bottle, and the carbon dioxide gas desorption efficiency was measured and whether precipitates formed due to nitrogen oxides was confirmed.

The $CO_2$ absorption amount (L) in one hour was 2.45 L as calculated as normal state. That is, the $CO_2$ absorption amount (L) in one hour per kg of the carbon dioxide absorbing solution was 24. 5 L as calculated as normal state. The $CO_2$ absorption amount (mL/min) in one hour per unit time per kg of the carbon dioxide absorbing solution was 409 mL/min (=24.5 [L/hour]×1000 [mL/L]/60 [min/hour]).

The $CO_2$ desorption amount (L) in two hours was 1.24 L as calculated as normal state. That is, the $CO_2$ desorption amount (L) in two hours per kg of the carbon dioxide absorbing solution was 12.4 L as calculated as normal state. The $CO_2$ desorption amount (mL/min) in two hours per unit time per kg of the carbon dioxide absorbing solution was 103 mL/min (=12.4 [L/2hours]×1000 [mL/L]/120 [min/hour]).

The carbon dioxide gas desorption efficiency (=$CO_2$ desorption amount (L) in two hours/$CO_2$ absorption amount (L) in one hour) was 0.51.

No precipitates formed due to nitrogen oxides was confirmed.

The results are shown in Table 1.

Example 2

32.6 g of DHPP, 7.4 g of DABCOM and 60 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 1.

Example 3

50.0 g of DHPP, 7.4 g of DABCOM and 42.6 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 1.

Example 4

30 g of DABCOM and 70 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 1.

Example 5

36.7 g of DHPP, 8.3 g of DABCOM and 55 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 2.

Example 6

28.6 g of DHPP, 6.4 g of DABCOM and 65 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 2.

Example 7

24.5 g of DHPP, 5.5 g of DABCOM and 70 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 2.

Example 8

40.8 g of DHPP, 9.2 g of DABCOM and 50 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 2.

Example 9

34.7 g of DHPP, 7.8 g of DABCOM and 57.5 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 2.

Example 10

38.8 g of DHPP, 8.7 g of DABCOM and 52.5 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 2.

Comparative Example 1

30 g of MDEA and 70 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 1.

Comparative Example 2

32.6 g of MDEA, 7.4 g of PIP and 60 g of pure water were mixed and stirred to prepare a carbon dioxide absorbing solution (100 g), and in the same manner as in Example 1, the carbon dioxide gas desorption efficiency was measured and whether precipitates formed due to nitrogen oxides was confirmed. The evaluation results are shown in Table 1.

As shown in the above Examples, the carbon dioxide separation composition of the present invention has effects such that it is excellent in carbon dioxide desorption efficiency (desorption amount/absorption amount) and precipitates are less likely to form even if nitrogen oxides are included, as compared with known carbon dioxide separation compositions.

The present invention has been described in detail with reference to specific embodiments. However, it is apparent to those skilled in the art that various changes and modifications are possible without departing from the concept and the range of the present invention.

The entire disclosures of Japanese Patent Application No. 2020-011936 filed on Jan. 28, 2020, Japanese Patent Application No. 2020-049127 filed on Mar. 19, 2020 and Japanese Patent Application No. 2020-110107 filed on Jun. 26, 2020 including specifications, claims, drawings and summaries are incorporated herein by reference in their entireties.

INDUSTRIAL APPLICABILITY

The composition of the present invention is useful for separation and purification of carbon dioxide from combustion exhaust gas generated from e.g. heat power plants, steel plants and cement factories, and separation and purification of carbon dioxide from steam reformed gas obtained in steam reforming process.

The invention claimed is:

1. A carbon dioxide separation composition, containing a mixture of an amine compound represented by the following formula (1):

TABLE 1

| | | Ex. 1 | Ex. 2 | Ex. 3 | Ex. 4 | Ex. 5 | Ex. 6 |
|---|---|---|---|---|---|---|---|
| Composition of carbon dioxide separation composition [wt %] | DHPP | 30 | 32.6 | 50 | 0 | 36.7 | 28.6 |
| | DABCOM | 0 | 7.4 | 7.4 | 30 | 8.3 | 6.4 |
| | MDEA | 0 | 0 | 0 | 0 | 0 | 0 |
| | PIP | 0 | 0 | 0 | 0 | 0 | 0 |
| | Water | 70 | 60 | 42.6 | 70 | 55 | 65 |
| $CO_2$ absorption amount in one hour per kg of carbon dioxide absorbing solution [L] | | 24.5 | 23.3 | 17.4 | 7.1 | 24.5 | 18.7 |
| $CO_2$ desorption amount in two hours per kg of carbon dioxide absorbing solution [L] | | 12.4 | 9.5 | 13.1 | 3.4 | 10.4 | 9.4 |
| Desorption efficiency (desorption amount/absorption amount) | | 0.51 | 0.41 | 0.75 | 0.48 | 0.42 | 0.50 |
| Formation of precipitates by $NO_2$ blowing | | Nil | Nil | Nil | Nil | Nil | Nil |

TABLE 2

| | | Ex. 7 | Ex. 8 | Ex. 9 | Ex. 10 | Comp. Ex. 1 | Comp. Ex. 2 |
|---|---|---|---|---|---|---|---|
| Composition of carbon dioxide separation composition [wt %] | DHPP | 24.5 | 40.8 | 34.7 | 38.8 | 0 | 0 |
| | DABCOM | 5.5 | 9.2 | 7.8 | 8.7 | 0 | 0 |
| | MDEA | 0 | 0 | 0 | 0 | 30 | 32.6 |
| | PIP | 0 | 0 | 0 | 0 | 0 | 7.4 |
| | Water | 70 | 50 | 57.5 | 52.5 | 70 | 60 |
| $CO_2$ absorption amount in one hour per kg of carbon dioxide absorbing solution [L] | | 17.9 | 23.6 | 24.9 | 24.1 | 6.0 | 28.0 |
| $CO_2$ desorption amount in two hours per kg of carbon dioxide absorbing solution [L] | | 9.5 | 8.5 | 9.6 | 8.7 | 2.1 | 17.9 |
| Desorption efficiency (desorption amount/absorption amount) | | 0.53 | 0.36 | 0.39 | 0.36 | 0.35 | 0.64 |
| Formation of precipitates by $NO_2$ blowing | | Nil | Nil | Nil | Nil | Nil | Formed |

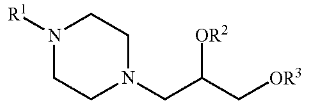

(1)

wherein $R^1$ to $R^3$ each independently represent a hydrogen atom or a $C_{1-4}$ alkyl group, and an amine compound represented by the following formula (2):

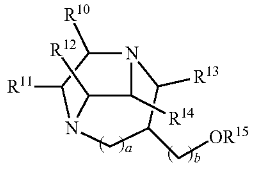

(2)

wherein $R^{10}$, $R^{11}$, $R^{12}$, $R^{13}$ and $R^{14}$ each independently represent a hydrogen atom, a $C_{1-4}$ alkyl group, a hydroxy group, a hydroxymethyl group, a 2-hydroxyethyl group or a $C_{1-4}$ alkoxy group, a and b are each independently 0 or 1 and satisfy the relation a+b=1, and $R^{15}$ is a hydrogen atom, a $C_{1-4}$ alkyl group, a methoxymethyl group, a methoxyethoxymethyl group or a 2-hydroxyethyl group, wherein the carbon dioxide separation composition further comprises water in a concentration of from 40 to 75 wt % to the total amount of the carbon dioxide separation composition.

2. The carbon dioxide separation composition of claim 1, consisting of the mixture of the amine compound represented by the formula (1) and the amine compound represented by the formula (2), and water.

3. The carbon dioxide separation composition according to claim 1, wherein the amine compound represented by the formula (2) is 1,4-diazabicyclo[2.2.2]octane-2-methanol.

4. The carbon dioxide separation composition according to claim 1, wherein the amine compound represented by the formula (1) is at least one member selected from the group consisting of 1-(2,3-dihydroxypropyl)-piperazine, 1-(2,3-dihydroxypropyl)-4-methylpiperazine, 1-(2,3-dihydroxypropyl)-4-ethylpiperazine, 1-(2,3-dihydroxypropyl)-4-propylpiperazine, 1-(2,3-dihydroxypropyl)-4-butylpiperazine, 1-(2-hydroxy-3-methoxypropyl)-piperazine, 1-(2-hydroxy-3-methoxypropyl)-4-methylpiperazine, 1-(2-hydroxy-3-methoxypropyl)-4-ethylpiperazine, 1-(2-hydroxy-3-methoxypropyl)-4-propylpiperazine, 1-(2-hydroxy-3-methoxypropyl)-4-butylpiperazine, 1-(2,3-dimethoxypropyl)-piperazine, 1-(2,3-dimethoxypropyl)-4-methylpiperazine, 1-(2,3-dimethoxypropyl)-4-ethylpiperazine, 1-(2,3-dimethoxypropyl)-4-propylpiperazine and 1-(2,3-dimethoxypropyl)-4-butylpiperazine.

5. The carbon dioxide separation composition according to claim 4, wherein the amine compound represented by the formula (2) is 1,4-diazabicyclo[2.2.2]octane-2-methanol.

6. The carbon dioxide separation composition according to claim 1, wherein the mixing ratio of the amine compound represented by the formula (1) and the amine compound represented by the formula (2) is such that the ratio of the amine compound represented by the formula (2) is from 0.1 to 99.9 parts by weight per 100 parts by weight of the amine compound represented by the formula (1).

7. The carbon dioxide separation composition according to claim 3, wherein the amine compound represented by the formula (2) is 1,4-diazabicyclo[2.2.2]octane-2-methanol.

8. The carbon dioxide separation composition according to claim 6, wherein the ratio of the amine compound represented by the formula (2) is from 1 to 90 parts by weight per 100 parts by weight of the amine compound represented by the formula (1).

9. The carbon dioxide separation composition according to claim 6, wherein the amine compound represented by the formula (1) is at least one member selected from the group consisting of 1-(2,3-dihydroxypropyl)-piperazine, 1-(2,3-dihydroxypropyl)-4-methylpiperazine, 1-(2,3-dihydroxypropyl)-4-ethylpiperazine, 1-(2,3-dihydroxypropyl)-4-propylpiperazine, 1-(2,3-dihydroxypropyl)-4-butylpiperazine, 1-(2-hydroxy-3-methoxypropyl)-piperazine, 1-(2-hydroxy-3-methoxypropyl)-4-methylpiperazine, 1-(2-hydroxy-3-methoxypropyl)-4-ethylpiperazine, 1-(2-hydroxy-3-methoxypropyl)-4-propylpiperazine, 1-(2-hydroxy-3-methoxypropyl)-4-butylpiperazine, 1-(2,3-dimethoxypropyl)-piperazine, 1-(2,3-dimethoxypropyl)-4-methylpiperazine, 1-(2,3-dimethoxypropyl)-4-ethylpiperazine, 1-(2,3-dimethoxypropyl)-4-propylpiperazine and 1-(2,3-dimethoxypropyl)-4-butylpiperazine.

10. The carbon dioxide separation composition according to claim 9, wherein the amine compound represented by the formula (2) is 1,4-diazabicyclo[2.2.2]octane-2-methanol.

11. The carbon dioxide separation composition according to claim 6, wherein the ratio of the amine compound represented by the formula (2) is from 5 to 50 parts by weight per 100 parts by weight of the amine compound represented by the formula (1).

12. The carbon dioxide separation composition according to claim 11, wherein the amine compound represented by the formula (2) is 1,4-diazabicyclo[2.2.2]octane-2-methanol.

13. The carbon dioxide separation composition according to claim 11, wherein the amine compound represented by the formula (1) is at least one member selected from the group consisting of 1-(2,3-dihydroxypropyl)-piperazine, 1-(2,3-dihydroxypropyl)-4-methylpiperazine, 1-(2,3-dihydroxypropyl)-4-ethylpiperazine, 1-(2,3-dihydroxypropyl)-4-propylpiperazine, 1-(2,3-dihydroxypropyl)-4-butylpiperazine, 1-(2-hydroxy-3-methoxypropyl)-piperazine, 1-(2-hydroxy-3-methoxypropyl)-4-methylpiperazine, 1-(2-hydroxy-3-methoxypropyl)-4-ethylpiperazine, 1-(2-hydroxy-3-methoxypropyl)-4-propylpiperazine, 1-(2-hydroxy-3-methoxypropyl)-4-butylpiperazine, 1-(2,3-dimethoxypropyl)-piperazine, 1-(2,3-dimethoxypropyl)-4-methylpiperazine, 1-(2,3-dimethoxypropyl)-4-ethylpiperazine, 1-(2,3-dimethoxypropyl)-4-propylpiperazine and 1-(2,3-dimethoxypropyl)-4-butylpiperazine.

14. The carbon dioxide separation composition according to claim 13, wherein the amine compound represented by the formula (2) is 1,4-diazabicyclo[2.2.2]octane-2-methanol.

15. The carbon dioxide separation composition according to claim 6, wherein the ratio of the amine compound represented by the formula (2) is from 10 to 30 parts by weight per 100 parts by weight of the amine compound represented by the formula (1).

16. The carbon dioxide separation composition according to claim 15, wherein the amine compound represented by the formula (2) is 1,4-diazabicyclo[2.2.2]octane-2-methanol.

17. The carbon dioxide separation composition according to claim 15, wherein the amine compound represented by the formula (1) is at least one member selected from the group consisting of 1-(2,3-dihydroxypropyl)-piperazine, 1-(2,3-dihydroxypropyl)-4-methylpiperazine, 1-(2,3-dihydroxypropyl)-4-ethylpiperazine, 1-(2,3-dihydroxypropyl)-4-propylpiperazine, 1-(2,3-dihydroxypropyl)-4-butylpiperazine, 1-(2-hydroxy-3-methoxypropyl)-piperazine, 1-(2-hydroxy-3-methoxypropyl)-4-methylpiperazine, 1-(2-hydroxy-3-methoxypropyl)-4-ethylpiperazine, 1-(2-hydroxy-3-methoxypropyl)-4-propylpiperazine, 1-(2-hydroxy-3-methoxypropyl)-4-butylpiperazine, 1-(2,3-dimethoxypropyl)-piperazine, 1-(2,3-dimethoxypropyl)-4-methylpiperazine, 1-(2,3-dimethoxypropyl)-4-ethylpiperazine, 1-(2,3-dimethoxypropyl)-4-propylpiperazine and 1-(2,3-dimethoxypropyl)-4-butylpiperazine.

18. The carbon dioxide separation composition according to claim 17, wherein the amine compound represented by the formula (2) is 1,4-diazabicyclo[2.2.2]octane-2-methanol.

19. A method for separating carbon dioxide, which comprises a step of bringing a gas containing carbon dioxide into contact with the carbon dioxide separation composition as defined in claim 1 to make the carbon dioxide in the gas mixture be absorbed.

* * * * *